United States Patent
Mahapatra et al.

(10) Patent No.: US 10,506,365 B1
(45) Date of Patent: Dec. 10, 2019

(54) POWER EFFICIENT DYNAMIC GEOFENCES

(71) Applicant: AMAZON TECHNOLOGIES, INC., Seattle, WA (US)

(72) Inventors: Abinash Mahapatra, Cupertino, CA (US); Hemant S. Petluri, Sunnyvale, CA (US)

(73) Assignee: Amazon Technologies, Inc., Seattle, WA (US)

(*) Notice: Subject to any disclaimer, the term of this patent is extended or adjusted under 35 U.S.C. 154(b) by 201 days.

(21) Appl. No.: 14/620,975

(22) Filed: Feb. 12, 2015

(51) Int. Cl.
*H04W 36/00* (2009.01)
*H04W 4/021* (2018.01)

(52) U.S. Cl.
CPC .................. *H04W 4/021* (2013.01)

(58) Field of Classification Search
CPC .............. H04W 4/021; H04W 4/022
See application file for complete search history.

(56) References Cited

U.S. PATENT DOCUMENTS

| | | | | |
|---|---|---|---|---|
| 2012/0046040 A1* | 2/2012 | Chatterjee | ............. | H04W 24/10 455/456.1 |
| 2013/0099977 A1* | 4/2013 | Sheshadri | ............. | H04W 4/022 342/450 |
| 2013/0178233 A1* | 7/2013 | McCoy | ................. | H04W 4/021 455/456.3 |
| 2014/0199980 A1* | 7/2014 | Rao | ........................ | H04W 4/022 455/418 |
| 2014/0256357 A1* | 9/2014 | Wang | ..................... | H04W 4/02 455/456.3 |
| 2014/0279123 A1* | 9/2014 | Harkey | ................. | H04W 4/021 705/26.1 |
| 2015/0149542 A1* | 5/2015 | Jain | ......................... | H04L 51/20 709/204 |
| 2015/0180816 A1* | 6/2015 | Varoglu | ................... | H04L 51/24 709/206 |
| 2015/0199896 A1* | 7/2015 | Estes | .................... | G08B 27/001 340/541 |
| 2015/0254704 A1* | 9/2015 | Kothe | .................... | G06Q 30/06 705/14.26 |
| 2016/0150365 A1* | 5/2016 | Brown | .................. | H04W 4/021 455/410 |

\* cited by examiner

*Primary Examiner* — Amancio Gonzalez
(74) *Attorney, Agent, or Firm* — Lowenstein Sandler LLP

(57) ABSTRACT

Location-based services using geofencing are described. An electronic device includes a processing device that determines that the electronic device is to alert that the electronic device is near a target. The processing device determines a device location of the electronic device based on one or more network access points in communication range of the electronic device and determines a geofence encompassing the device location, wherein the geofence is located at a first distance from the target that exceeds a second distance that is between the device location and a target location of the target by an amount associated with a margin of error value in determining the device location using the one or more network access points. In response, the processing device generates an alert that the geofence has been breached.

19 Claims, 6 Drawing Sheets

POWER EFFICIENT DYNAMIC GEOFENCES

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. These electronic devices wirelessly communicate with a communications infrastructure to enable the consumption of the digital media items. These devices may include a number of ways to determine the location of the device and implement location-based services.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION

Figure 1A:
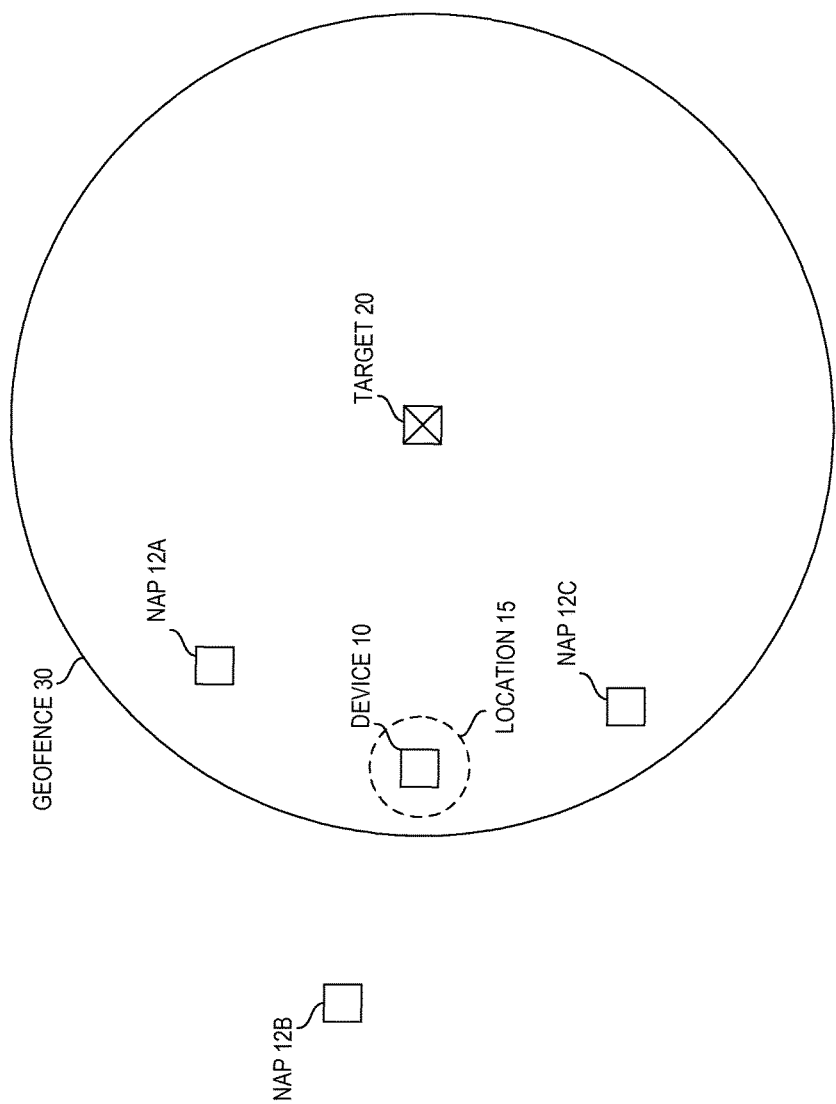
FIG. 1A is a diagram of a device near a target.

An electronic device may provide location-based services to a user. One way to implement location-based services is through the use of geofencing. Geofencing is a concept in location technology in which a geofence (a virtual shape encompassing a physical geographic area) is created by a geofence engine. A geo-fence can be used to create a predefined set of boundaries, like school attendance zones or neighborhood boundaries. Geofencing can be used with child location services to notify parents if a child leaves a designated area, or with locationized firearms to allow those firearms to fire only in locations where their firing is permitted. Geofencing can be used in telematics hardware and software to allow users of the system to draw zones around places of work, customer sites and secure areas. Geofencing can be used to monitor employees working in special locations or to log employee attendance using a GPS-enabled device when within a designated perimeter. Other applications include sending an alert if a vehicle is stolen and notifying rangers when wildlife strays into farmland. Geofencing can provide security to wireless local area networks using predefined borders or to distribute location specific ads to customers on their mobile devices, among other uses. When the geofence is breached, the geofence engine executes a predefined action. For example, the geofence engine may send an alert to the user.

A geofence engine may continually determine the distance of the electronic device to the nearest geofence using one or more of cellular, wireless local area network (WLAN), or global positioning system (GPS) positioning to determine the location of the electronic device. As turning on GPS uses more electrical power than cellular or WLAN positioning, emphasis may be given to using low-power network-based positioning. For example, if the nearest geofence is approximately 50 kilometers (km) away from the electronic device and the electronic device can determine its location using cellular positioning with approximately 2 km accuracy, the electronic device may not utilize GPS positioning. As the electronic device approaches the geofence (e.g., within 100 meters), the geofence engine may begin to use GPS positioning to determine a more accurate location and timely notify the user when the geofence has been breached.

Although geofencing may provide useful information to a user with respect to a location-based service, it may undesirably use a large amount of electrical power due to its use of GPS positioning. Described herein are methods are systems that provide the advantages of geofencing location-based services while using low amounts of electrical power. For example, a geofence may be defined that encompasses the location of the user such that a geofence engine generates an alert that a geofence has been breached without using GPS positioning data. The GPS positioning data may include, for example, date and clock information, such as a week number and the time within the wee, satellite health information, satellite orbit and location information, etc.

Figure 1B:
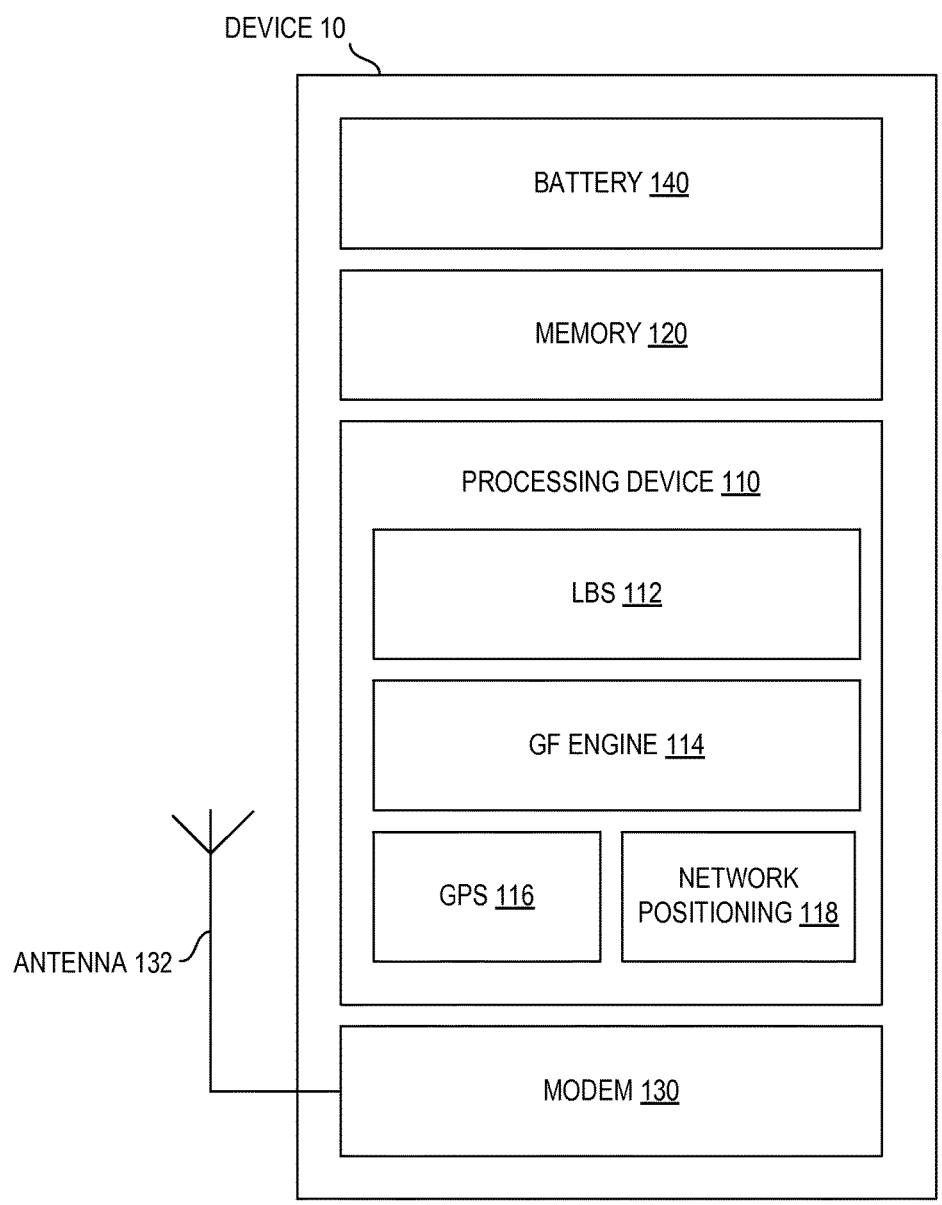
FIG. 1B is a functional block diagram of an embodiment of the device of FIG. 1A.

FIG. 1A is a diagram of a device 10 approaching a target 20. FIG. 1B is a functional block diagram of an embodiment of the device 10 of FIG. 1A. The device 10 includes a processing device 110, a memory 120, a modem 130 to communicate via an antenna 132, and a battery 140. The processing device 110 includes a location-based services (LBS) module 112 that implements location-based services. The processing device 110 includes a geofence (GF) engine that assists in the implementation of location-based services. The processing device includes a GPS module 116 that determines a location of the device 10 using GPS and a network positioning module 118 that determines a location of the device 10 using network-based positioning.

The LBS module 112 may determine that a user of the electronic device 10 is to be alerted that the user is near a target 20 or approaching a target 20. For example, the LBS module 112 may receive a notification, via the modem 130, from a vehicle driven by the user that the vehicle is running low on gas. In response, the LBS module 112 may determine that the user is to be alerted when the user is near a gas station. As another example, the LBS module 112 may receive a notification, via the modem 130, from a health monitor of the user that the user is in need of medical attention. In response, the LBS module 112 may determine that the user is to be alerted when the user is near a hospital, emergency room, or other medical facility. As another example, the LBS module 112 may receive a notification, via the modem 130, from a network access point 12A-12C regarding a hole or blind spot in network coverage. In response, the LBS module 112 may determine that the user is to be alerted when the user is near the hole with no coverage.

Thus, the LBS module 112 may determine that a user is to be alerted when the user is near a target 20 based on information received via the modem 130 from an external device. The LBS module 112 may determine that a user is to be alerted based on information provided by the user, e.g., a set of preferences. For example, the LBS module 112 may determine that a user is to be alerted when the user is near a rest stop, coffee shop, or other point of interest along a route based on information provided by the user (e.g., via a mapping application). The preferences may indicate that a user is not to be alerted that the user is near a rest stop if the user has stopped at a rest stop within a certain time period or within a certain distance. The LBS module 112 may determine that a user is to be alerted when the user is near a target 20 based on other information.

Using the network positioning module 118, the device 10 may determine its location 15 with a particular accuracy. The network positioning module 118 may determine one or more network access points (NAP) 12A-12C that the device 10 is in communication range of and may communicate with using the modem 130 via the antenna 132. The network access points 12A-12C may be cellular access points, wireless local area network (WLAN) access point, or access points of other types of networks. The network positioning module 118 may determine the location 15 of the device 10 based on the network access points 12A-12C within communication range of the device 10. The network positioning module 118 may consult a table, data structure, or other mapping (either stored locally in the memory 120 or via the modem 130) that maps or otherwise associates network access points (or sets of network access points) to or with a location. For example, the network positioning module 118 may consult a table that maps cell ID to a location with an accuracy of approximately 1 km to 3 km. As another example, the network positioning module 118 may consult a table that maps Wi-Fi® network ID to a location with an accuracy of approximately 200 m to 500 m. Alternatively, mapping may be performed with other accuracies.

In one embodiment, when the LBS module 112 determines that a user is to be alerted that the user is near a target 20, the LBS module 112 generates an alert to the user. For example, the LBS module 112 may cause the electronic device 10 to generate an audio or visual indication, via a display device or a speaker, indicating that the user is near the target 20. However, the LBS module 112 may not provide the advantages of an alert generated by the GF engine 114 or may require redundant programming to generate an alert that may be efficiently generated by the GF engine 114.

Thus, in another embodiment, when the LBS module 112 determines that a user is to be alerted that the user is approaching a target 20, the LBS module 112 defines a geofence 30 around the target 20. The LBS module 112 may define the geofence 30 using the GF engine 114 via a geofence engine application programming interface (API).

In one embodiment, the geofence 30 is defined without respect to the current location 15 of the electronic device 10. For example, the geofence 30 may be defined as a circle surrounding the target 20 with a radius of approximately 1 km to 5 km. To handle the geofence 30, as described above, the GF engine 114 may continually determine the distance of the electronic device 10 to the geofence 30 using one or more of the GPS module 116 or the network positioning module 118. As the electronic device 10 approaches the geofence 30, the GF engine 114 may use the GPS module 116 to determine a more accurate location and generate an alert to the user when the geofence 30 has been breached. However, as mentioned above, the use of the GPS module 116 may be a significant drain on the battery 140 of the electronic device 10.

Thus, in another embodiment, the geofence 30 is defined based on the current location 15 of the electronic device 10. For example, as illustrated in FIG. 1A, the LBS module 112 may define the geofence 30 as a circle surrounding the target 20 with a radius large enough for the circle to encompass the location 15 of the electronic device 10. In one embodiment, the geofence 30 has a radius around the target 20 that exceeds a distance between the location 15 of the electronic device and a location of the target 20 by an amount associated with a margin of error value in determining the location of the electronic device using the set of one or more network access points 12A-12C. For example, if the margin of error value is +/−1 km and the distance between the device 10 and the target 20 is 20 km, the radius of the geofence 30 may be set at a minimum of 21 km. In handling this geofence 30, the GF engine 114 may determine that the geofence 30 has been breached without using the GPS module 116 to determine a more accurate location of the electronic device 10. In response, the GF engine 114 may generate an alert to the user indicating that the geofence 30 has been breached and may provide additional information to the user, such as the location of the target 20 or an approximate distance to the target 20.

Once the geofence 30 has been breached and the GF engine 114 generates an alert to the user, the LBS module 112 may delete the geofence 30. The LBS module 112 may delete the geofence 30 by using the GF engine 114 via a geofence engine application programming interface (API).

In addition to dynamic geofences defined and deleted by the LBS module 112, the GF engine 114 may handle static geofences defined by the LBS module 112 or other modules. The static geofences may be generated without respect to the location of the electronic device 10 with a fixed radius around particular points-of-interest based on user preferences. The GF engine 114 may handle the static geofences as described above by continually determining the distance of the electronic device 10 to the geofence and, as the electronic device 10 approaches the geofence, using the GPS module 116 to determine a more accurate location and generate an alert to the user when the geofence has been breached.

Thus, the GF engine 114 may store, in the memory 120, a table of geofences to monitor. The table may include entries including data regarding static geofences and, in response to the LBS module 112 defining a dynamic geofence, an entry including data regarding the dynamic geofence. The GF engine 114 may remove the entry including data regarding the dynamic geofence from the table in response to a command from the LBS module 112 via the geofence engine API to delete the geofence.

Figure 2:
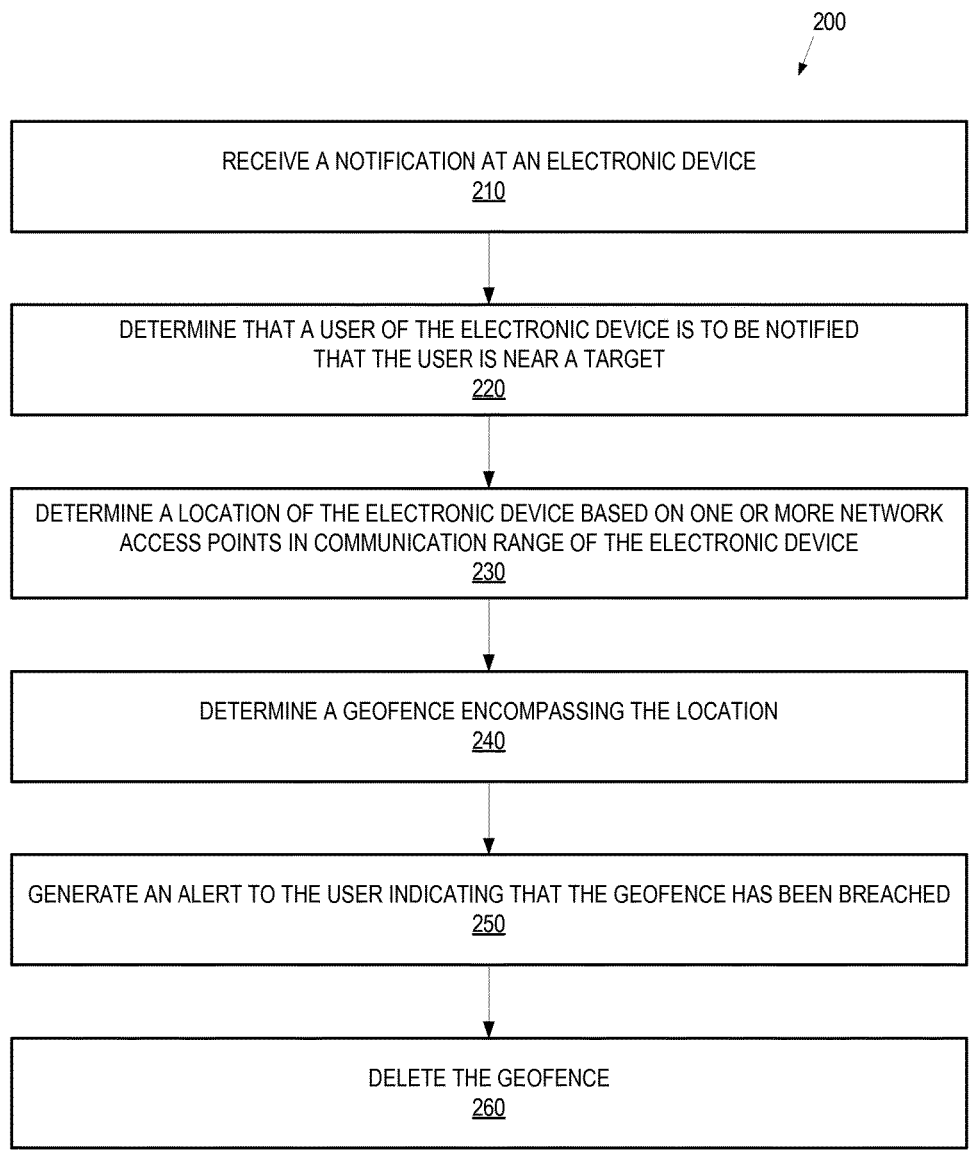
FIG. 2 is a flowchart illustrating an embodiment of a method of generating a location-based alert using geofencing.

FIG. 2 is a flowchart illustrating an embodiment of a method 200 of generating a location-based alert using geofencing. The method 200 may be performed by processing logic that may include hardware (e.g., circuitry, dedicated logic, programmable logic, microcode, etc.), software (e.g., instructions executed by a processing device), firmware or a combination thereof. For example, the method 200 may be performed, at least in part, by the processing device 110 of FIG. 1B.

At block 210, the processing logic receives a notification at an electronic device. The processing logic may receive the notification from an external device via a modem, such as the modem 130 of FIG. 1B. The processing logic may receive the notification via a cellular, wireless local area network, BLUETOOTH®, or any other network connection or protocol. The notification may, for example, be received from a vehicle and generally indicate an amount of gas of a vehicle or specifically indicate that the vehicle has less than a threshold amount of gas. The notification may, as another example, be received from a health monitor and may generally a health parameter of the user or specifically indicate that the user is in need of medical attention. The notification may be received from any other external device and may provide any kind of information.

The notification may be received by the processing logic from within the electronic device. For example, the processing logic may receive a notification that the user is downloading a file. As another example, the processing logic may receive a notification that the user has selected preferences for a location-based service. The selected preferences may indicate that the user would like to be alerted when near specific points of interest, such as rest stops, grocery stores, etc.

At block 220, the processing logic determines that a user is to be alerted that the user is near a target. The processing logic may execute a location-based services (LBS) module to determine that the user is to be alerted that the user is near a target. The processing logic may determine that the user is to be alerted that the user is near a target in response to receiving the notification. To determine that the user is to be alerted, the processing logic may determine a target based on the notification. For example, the processing logic may determine the nearest gas station in response to a notification regarding a vehicle gas level. The processing logic may determine the nearest medical facility in response to a notification from a health monitor. The processing logic may determine the nearest hole in cellular coverage in response to a notification that the user is downloading a file. The processing logic may determine the nearest point of interest in response to a notification indicating a user preference.

The processing logic may determine that the user is to be alerted that the user is near a target based on a location of the electronic device (as determined, e.g., in block 230 described below). The processing logic may determine that a user is to be alerted that the user is near the target when a location of the electronic device is less than a threshold distance from a location of the target. The threshold may be dynamic based on the notification. For example, if the processing logic receives an indication of a gas tank level, the processing logic may determine that a user is to be alerted that the user is near a gas station based on the gas level and the distance to the nearest gas station. If the gas level is high or the user is near the gas station, the processing logic may not determine that the user is to be alerted. However, if the gas level is low or the user is far from the closest gas station or the next closest gas station, the processing logic may determine that the user is to be alerted. The processing logic may determine that the user is to be alerted based on miles per gallon or other measure of gas usage efficiency. The processing logic may determine that the user is to be alerted based on other information.

At block 230, the processing logic determines a location of the electronic device based on one or more network access points in communication range of the electronic device. The processing logic may determine the location of the electronic device using network-based positioning and without using GPS positioning. In particular, the processing logic may determine the location of the electronic device by executing a network positioning module and without executing a GPS positioning module. The processing logic may determine, e.g., using a modem, a set one or more network access points in communication range of the electronic device. The network access points may be cellular, WLAN, or other network access points. The processing logic may determine the location of the electronic device by consulting a mapping that maps the set of one or more network access points in communication range of the electronic device to the location.

At block 240, the processing logic determines a geofence encompassing the location. The processing logic may execute a location-based services (LBS) module to determine the geofence via a geofence engine application programming interface of a geofence engine also executed by the processing logic. The processing logic may define the geofence as a circle having a particular radius and a center. The center may be defined in latitude and longitude and the radius may be defined in meters or any other measure of distance. The center may be location of the target. The radius may be defined such that the circle encompasses the location of the electronic device. The radius may be defined such that the circle encompasses the location of the electronic device subject to the accuracy of the location determination. In one embodiment, the geofence 30 has a radius around the target 20 that exceeds a distance between the location 15 of the electronic device and a location of the target 20 by an amount associated with a margin of error value in determining the location of the electronic device using the set of one or more network access points 12A-12C. For example, if the accuracy of the location determination is plus-or-minus 1 km and the distance to the target is 20 km, the radius may be 21 km or slightly greater. Thus, the processing logic may define the geofence by determining and providing a center location and a radius to a geofence engine via a geofence application programming interface, the center location being the location of the target and the radius being greater than the distance from the location of the electronic device to the location of the target. The processing logic may define the geofence by providing other information to the geofence engine using the geofencing application programming interface. Defining the geofence may include adding, by the geofence engine, an entry to a table of geofences to monitor, the entry including data regarding the geofence. The geofence may be defined by other parameters and may be any shape encompassing the location of the electronic device.

At block 250, the processing logic generates an alert to the user indicating that the geofence has been breached. The processing logic may generate the alert by executing a geofence engine that generates the alert. The geofence engine may determine that the location of the electronic device is within the geofence and, in response, generate the alert. The alert may be generated by the geofence engine without executing a GPS module of the processing logic or otherwise using GPS positioning. The alert may indicate that the geofence has been breached by indicating that the user is near the target. The alert may include additional information, such as a distance to the target, a route to the target, an estimated time to the target, or any other information. In one embodiment, the alert may be presented by at least one of a display screen or speaker of the electronic device. In another embodiment, the alert may be presented by a device accessory, or other networked or paired device (e.g., through the car, smartphone, tablet, headset, smartwatch, etc.).

At block 260, having generated the alert to the user indicating that the geofence has been breached, the processing logic deletes the geofence. The processing logic may execute a location-based services (LBS) module to delete the geofence via a geofence engine application programming interface of a geofence engine also executed by the processing logic. Deleting the geofence may include removing, by the geofence engine, an entry of a table of geofences to monitor, the entry including data regarding the geofence. Thus, the geofence is dynamically generated and deleted by the processing logic to generate a location-based alert via a geofence engine without using GPS.

Figure 3:
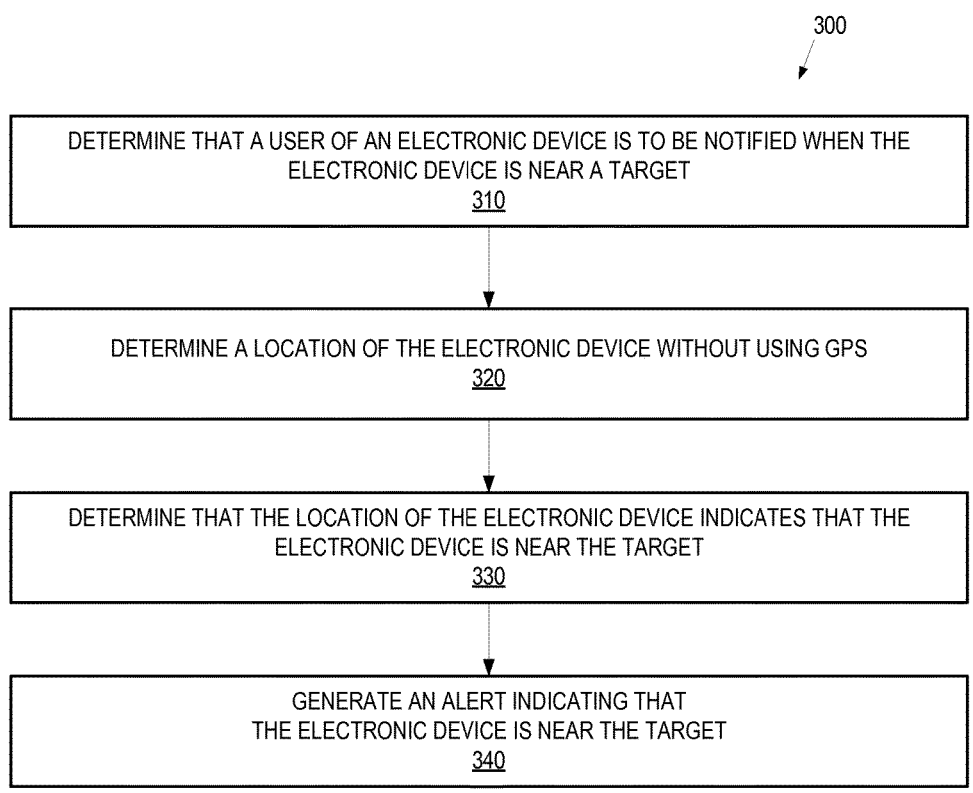
FIG. 3 is a flowchart illustrating an embodiment of a method of generating a location-based alert without GPS positioning.

FIG. 3 is a flowchart illustrating an embodiment of a method 300 of generating a location-based alert without GPS positioning. The method 300 may be performed by processing logic that may include hardware (e.g., circuitry, dedicated logic, programmable logic, microcode, etc.), software (e.g., instructions executed by a processing device), firmware or a combination thereof. For example, the method 300 may be performed, at least in part, by the processing device 110 of FIG. 1B.

At block 310, the processing logic determines that a user of the electronic device is to be alerted when the electronic device is near a target. The processing logic may determine that the user is to be alerted based on a notification received from an external device. The processing logic may determine that the user is to be alerted based on a notification from an application executed by the processing logic. For example, the application may be a ride sharing service that indicates a customer to be picked up at a particular location. The application may be an application downloading a file. The application may be a location-based services application that includes user preferences indicating points of interest. The processing logic may determine a location of the target.

At block 320, the processing logic determines a location of the electronic device without using GPS positioning. The processing logic may determine the location of the electronic device using various low-power positioning modules. The processing logic may determine the location of the electronic device using a network-based positioning module. The processing logic may determine the location of the electronic device based on one or more network access points the electronic device is in communication range of. The processing logic may determine one or more network access points in communication range of the electronic device. The network access points may be cellular, WLAN, or other network access points. The processing logic may consult a table or mapping that maps sets of one or more network access points to a location.

At block 330, the processing logic determines that the location of the electronic device indicates that the electronic device is near the target. The method 300 may repeat block 320 until the processing logic determines that the electronic device is near the target. The processing logic may determine that the location of the electronic device indicates that the electronic device is near the target when a distance between the location of the electronic device and the location of the target is less than a threshold distance.

The threshold may be dynamic based on information received by the processing logic. For example, the threshold may be set based on user preferences of a location-based services application. As another example, the threshold may be based on a gas level received from a vehicle and the distance to one or more gas stations. The threshold may be may be based on a size of file being downloaded (or a time to download the file) and a distance to a hole in cellular coverage (or an estimate time to reach the hole in cellular coverage based on a speed of the electronic device).

At block 340, responsive to determining that the location of the electronic device indicates that the electronic device is near the target, the processing logic generates an alert. The processing logic may generate an alert to the user or to other electronic devices. For example, the processing logic may generate an alert to the user indicating that a vehicle driven by the user is low on gas. As another example, the processing logic may generate an alert to a second electronic device indicating that the user of the electronic device is in need of medical attention and is a specific distance from a medical facility.

The processing logic may generate the alert by defining a geofence encompassing the location and executing a geofence engine to generate an alert indicating that the geofence has been breached. The geofence engine may determine that the geofence has been breached and, in response, generate the alert. The alert may include additional information, such as a distance to the target, a route to the target, an estimated time to the target, or any other information.

Figure 4:
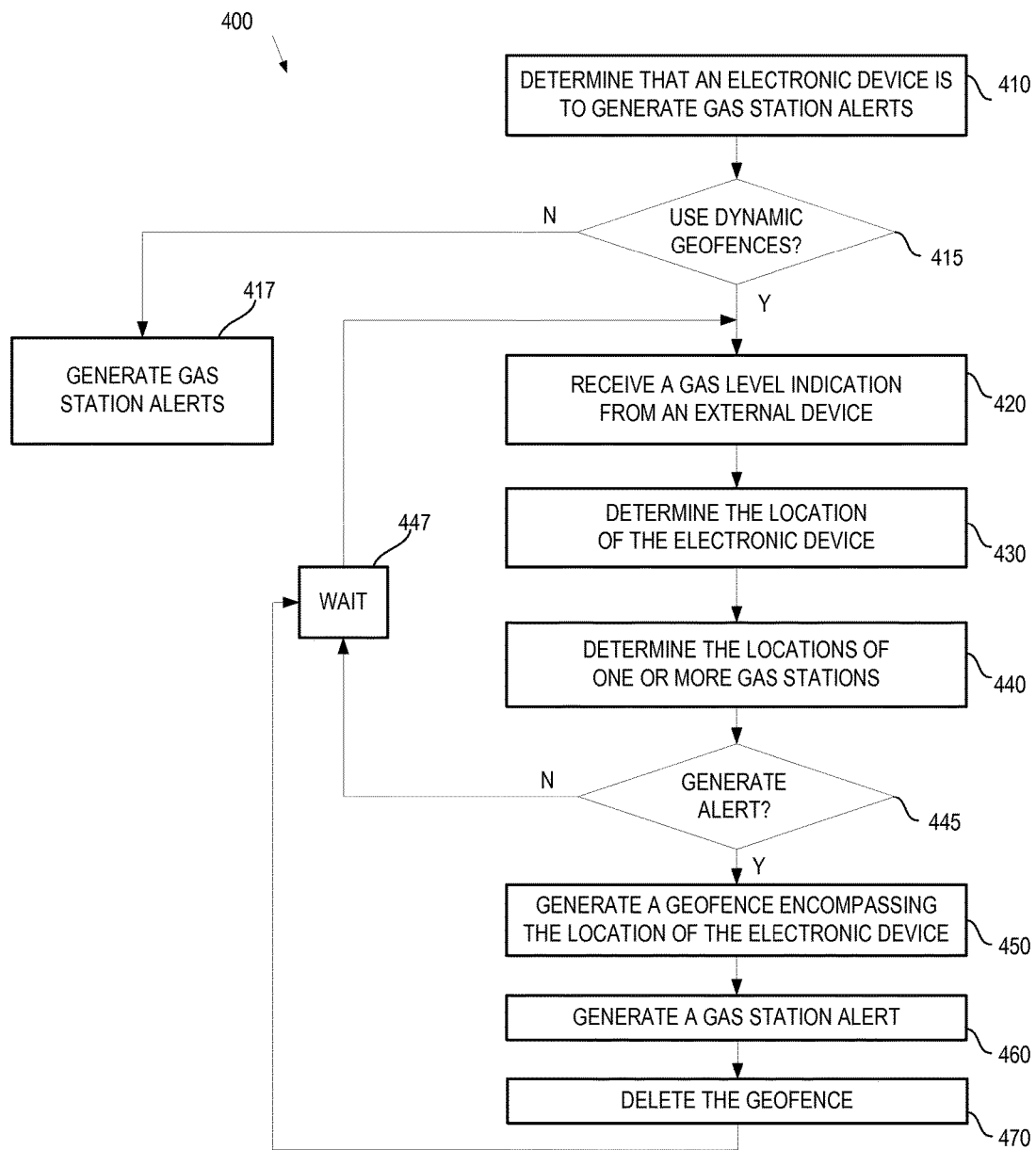
FIG. 4 is a flowchart illustrating an embodiment of a method of generating a gas station alert using geofencing.

FIG. 4 is a flowchart of an embodiment illustrating an example method 400 of generating a gas station alert using geofencing. The method 400 may be performed by processing logic implemented, at least in part, by processing device 110 of FIG. 1B. Although FIG. 4 describes the specific case of using dynamic geofences to generate a gas station alert using a gas level indication and the location of one or more gas stations, it is to be appreciated that various implementation details may be used in other use cases to generate alerts using dynamic geofences based on other received information and the location of other targets as described above.

The method 400 begins, at block 410, with the determination that an electronic device is to generate gas station alerts. The processing logic may determine that the electronic device is to generate gas station alerts based on user preferences stored on the electronic device that indicate that gas station alerts are active or inactive. The processing logic may determine that the electronic device is to generate gas station alerts based on a system configuration such as the presence of executable code for generating gas station alerts. A gas station alert may be an alert that indicates to a user that the electronic device (and the user of the electronic device) is near a gas station or that a vehicle driven by the user is low on gas.

At block 415, the processing logic determines whether the gas station alerts are to be generated using dynamic geofences. The processing logic may determine whether the gas station alerts are to be generated using dynamic geofences based on additional user preferences stored on the electronic device or based on an additional system configuration. If the processing logic determines that the gas station alerts are not to be generated using dynamic geofences, the method continues to block 417 where gas station alerts are generated using other methods, e.g., static geofences or other location-based services. If the processing logic determines that the gas station alerts are to be generated using dynamic geofences, the method continues to block 420.

At block 420, the processing logic receives a gas level indication from an external device. The gas level indication may indicate an amount of gas of a vehicle driven by a user. The amount of gas may be expressed in any number of ways, e.g., a number of gallons left in a tank, a number of miles that may be travelled by the vehicle before the gas tank is empty, an indication that the gas level is below a threshold amount, or any other way. The processing logic may receive the gas level indication from an external device, e.g., a vehicle computer system, via a modem. The processing logic may receive the gas level indication via a cellular, wireless local area network, BLUETOOTH®, or any other network connection or protocol.

At block 430, the processing logic determines the location of the electronic device. The processing logic may determine the location of the electronic device without using GPS. The processing logic may determine the location of the electronic device using various low-power positioning modules. The processing logic may determine the location of the electronic device using a network-based positioning module. The processing logic may determine one or more network access points in communication range of the electronic device and determine the location of the electronic device based on the one or more network access points in communication range of the electronic device. The network access points may be cellular, WLAN, or other network access points. The processing logic may consult a table or mapping that maps sets of one or more network access points to a location.

At block 440, the processing logic determines the locations of one or more gas stations. The locations of the gas stations may be determined by consulting a table stored by the processing logic that indicates the locations of a number of gas stations. The locations of the gas stations may be determined by querying a server regarding gas station locations and receiving an indication of the locations of gas stations near the location of the electronic device.

At block 445, the processing logic determines whether to generate a gas station alert. The processing logic may determine whether to generate the gas station alert based on the gas level indication, the location of the electronic device, and the locations of the one or more gas stations. For example, the gas level indication may indicate that the vehicle may travel for another 50 km before running out of gas and the locations of the electronic device and gas stations may indicate that the nearest gas station is 20 km from the electronic device and that the next nearest gas station is 70 km from the electronic device. In response, the processing logic may determine that a gas station alert is to be generated to inform the user that the user should stop at the nearest gas station to put additional gas into the vehicle. As another example, the gas level indication may indicate that the vehicle may travel for another 250 km before running out of gas and the locations of the electronic device and gas stations may indicate that there are many gas stations near the electronic device and along a path to be travelled by the electronic device. In response, the processing logic may determine that a gas station alert is not to be generated.

In general, if the gas level indication indicates that the gas level is low, it may be more likely that the processing logic determines that a gas station alert is to be generated. In contrast, if the gas level indication indicates that the gas level is high, it may be less likely that the processing logic determines that a gas station alert is to be generated. Further, if the locations of the electronic device and the gas stations indicate that there are few gas stations near the electronic device or along a path to be travelled by the electronic device, it may be more likely that the processing logic determines that a gas station alert is to be generated. In contrast, if the locations of the electronic device and the gas stations indicate that there are many gas stations near the electronic device or along a path to be travelled by the electronic device, it may be less likely that the processing logic determines that a gas station alert is to be generated.

If the processing logic determines, at block 445, not to generate a gas station alert, the method continues to block 447 to wait an amount of time before returning to block 420. In one embodiment, the amount of time the processing logic waits at block 447 is fixed such that the processing logic determines whether to generate a gas station alert based on gas level and location on a periodic basis. The amount of time may be fixed by a system configuration or set by user preferences. The amount of time may be, for example, ten seconds, thirty seconds, one minute, five minutes, ten minutes, or any other amount of time.

In another embodiment, the amount of time the processing logic waits at block 447 is dynamic such that the processing logic efficiently monitors the gas level and location to determine whether to generate a gas station alert. For example, if the gas level indication indicates that the gas level is high, the amount of time the processing logic waits at block 447 may be higher than if the gas level indication indicates that the gas level is low. Similarly, if the locations of the electronic device and gas stations indicate that there are many gas stations near the electronic device or along a path to be travelled by the electronic device, the amount of time the processing logic waits at block 447 may be higher than if the locations indicate that there are few gas stations near the electronic device or its path.

In another embodiment, the amount of time the processing logic waits at block 447 is based on when the gas level indication is received at block 420. Thus, the processing logic may perform blocks 430, 440, and 445 in response to receiving a gas level indication from the external device. The gas level indication may be received periodically or in response to a query sent by the processing logic to the external device.

If the processing logic determines, at block 445, that a gas station alert is to be generated, the method continues to block 450 where the processing logic generates a geofence encompassing the location of the electronic device. The processing logic may execute a location-based services (LBS) module to define the geofence via a geofence engine application programming interface of a geofence engine also executed by the processing logic. The processing logic may define the geofence as a circle having a particular radius and a center. The center may be defined in latitude and longitude and the radius may be defined in meters or any other measure of distance. The center may be location of the nearest gas station. The radius may be defined such that the circle encompasses the location of the electronic device. The radius may be defined such that the circle encompasses the location of the electronic device subject to the accuracy of the location determination. For example, if the accuracy of the location determination is plus-or-minus 1 km and the distance to the nearest gas station is 20 km, the radius may be 21 km or slightly greater. Thus, the processing logic may define the geofence by determining and providing a center location and a radius to a geofence engine via a geofence application programming interface, the center location being the location of the nearest gas station and the radius being greater than the distance from the location of the electronic device to the location of the target. The processing logic may define the geofence by providing other information to the geofence engine using the geofencing application programming interface. The geofence may be defined by other parameters and may be any shape encompassing the location of the electronic device.

At block 460, the processing logic generates a gas station alert. The processing logic may generate the alert by executing a geofence engine that generates the alert. The geofence engine may determine that the location of the electronic device is within the geofence and, in response, generate the alert. The alert may be generated by the geofence engine without executing a GPS module of the processing logic or otherwise using GPS positioning. The gas station alert may indicate that the geofence has been breached by indicating that the user is near a gas station. The alert may include additional information, such as a distance to the nearest gas station, a route to the nearest gas station, an estimated time to the nearest gas station, or any other information.

In response to the gas station alert, a user may provide input indicating a desire for additional information regarding the gas station. For example, the user may request GPS-assisted directions to the nearest gas station. Thus, although the gas station alert may be generated without using GPS, the user may request that the processing logic execute further instructions that use GPS, e.g., to provide turn-by-turn instructions to reach the nearest gas station.

At block 470, having generated an alert using the geofence, the processing logic deletes the geofence. The processing logic may delete the geofence via a geofence engine application programming interface of a geofence engine also executed by the processing logic. Thus, the geofence is dynamically generated and deleted by the processing logic to generate a location-based alert via a geofence engine without using GPS.

Figure 5:
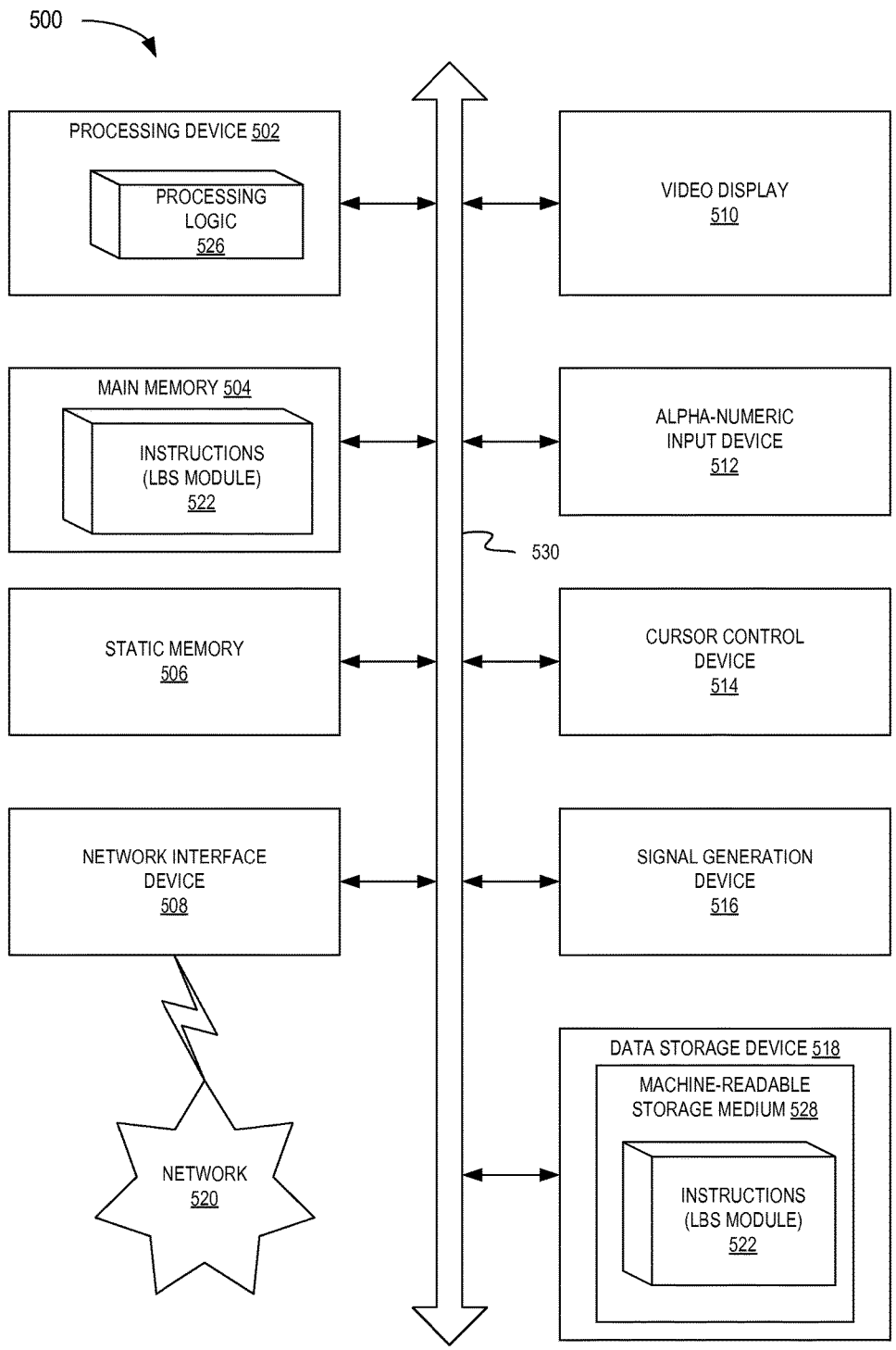
FIG. 5 illustrates a functional block diagram of an embodiment of an electronic device.

FIG. 5 illustrates a diagrammatic representation of a machine in the exemplary form of a computer system 500 within which a set of instructions for causing the machine to perform any one or more of the methodologies discussed herein may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may represent the electronic device 10 of FIG. 1B.

The exemplary computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 528 on which is stored one or more sets of instructions 522 (e.g., instructions of the location-based services module for performing one or more of the methods of FIGS. 2-3) embodying any one or more of the methodologies or functions described herein. The instructions 522 may also reside, completely or at least partially, within the main memory 504 and/or within processing logic 526 of the processing device 502 during execution thereof by the computer system 500, the main memory 504 and the processing device 502 also constituting computer-readable media. The instructions may further be transmitted or received over a network 520 via the network interface device 508.

While the computer-readable storage medium 528 is shown in an exemplary embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various systems may be used with programs in accordance with the teachings herein, or it may prove convenient to construct a more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by at least one processing device of an electronic device, a notification comprising information from an external device separate from the electronic device;
   identifying a target associated with the information from the external device;
   determining, by the at least one processing device, a device location of the electronic device by consulting a data structure that identifies a set of one or more network access points in communication range of the electronic device and that associates the set of one or more network access points with the device location;
   determining that the device location of the electronic device is less than a threshold distance from a target location of the target;
   determining that a user of the electronic device is to be alerted that the electronic device is near the target;
   determining a geofence encompassing the target location and the device location by adding an entry corresponding to the geofence to a table of active geofence entries, wherein determining the geofence includes defining a boundary of the geofence at a first distance from the target location, wherein the first distance exceeds a second distance between the device location and the target location by at least an amount associated with a margin of error in determining the device location using the set of one or more network access points, such that both the target location and the device location are within the boundary of the geofence;
   generating, based on the geofence and without referencing global positioning system (GPS) data, an alert presented by at least one of a display screen or speaker of the electronic device, the alert indicating that the device location is within the geofence; and
   deleting the geofence by removing the entry from the table of active geofence entries.

2. The method of claim 1, wherein determining the geofence encompassing the device location comprises providing a center location and a radius, the center location being the target location and the radius being greater than the second distance from the device location to the target location.

3. The method of claim 1, wherein receiving the notification comprises receiving, from the external device, a gas level indication via a modem associated with an automobile's computing system and wherein determining that the user is to be alerted that the electronic device is near the target comprises determining that a gas station alert is to be generated when the gas level indication is below a first threshold and when a distance between the device location and locations of one or more gas stations exceeds a second threshold.

4. An electronic device comprising:
   memory; and
   at least one processing device operatively coupled to the memory, the at least one processing device to:
   identify a target associated with information received in a notification;
   determine a device location of the electronic device using data from one or more network access points in communication range of the electronic device;
   determine a margin of error value associated with the device location;
   determine that the device location of the electronic device is less than a threshold distance from a target location of the target;
   determine that the electronic device is to alert that the electronic device is near the target;
   generate a geofence encompassing the target location and the device location, wherein to generate the geofence, the at least one processing device to define a boundary of the geofence at a first distance from the target location, wherein the first distance exceeds a second distance between the device location and the target location by at least an amount corresponding to the margin of error value, such that both the target location and the device location are within the boundary of the geofence; and generate, based on the geofence, an alert indicating that the device location is within the geofence.

5. The electronic device of claim 4, wherein the at least one processing device is to receive the notification and to determine that the electronic device is to alert that the electronic device is near the target, wherein the target is associated with the notification.

6. The electronic device of claim 4, wherein the notification is received from an external device.

7. The electronic device of claim 4, wherein the at least one processing device is to determine that the electronic device is to alert that the electronic device is near the target when the second distance that is between the device location and the target location is less than a threshold distance.

8. The electronic device of claim 4, wherein the at least one processing device is to determine the device location using a data structure that identifies the one or more network access points and associates the one or more network access points with the device location.

9. The electronic device of claim 4, wherein the one or more network access points comprises at least one of a cellular access point or a wireless local area network (WLAN) access point.

10. The electronic device of claim 4, wherein, to generate the geofence encompassing the device location, the at least one processing device is to determine a center location and a radius, the center location being the target location and the radius being greater than the second distance that is between the device location to the target location.

11. The electronic device of claim 4, wherein, to generate the geofence encompassing the device location, the at least one processing device is to provide information to a geofence engine via a geofence engine application programming interface.

12. The electronic device of claim 4, wherein, to generate the alert, the at least one processing device is to:
 determine that the device location is within the geofence; and
 generate the alert responsive to determining that the device location is within the geofence.

13. A method comprising:
 identifying, by at least one processing device of an electronic device, a target associated with information received in a notification;
 determining, by the at least one processing device, a device location of the electronic device without using GPS positioning;
 determining, by the at least one processing device, a margin of error value associated with the device location;
 determining, by the at least one processing device, that the device location of the electronic device is less than a threshold distance from a target location of the target;
 determining, by the at least one processing device, that the electronic device is to alert when the electronic device is near the target;
 generating, by the at least one processing device, a geofence encompassing the target location and the device location, wherein generating the geofence includes defining a boundary of the geofence at a first distance from the target location, wherein the first distance exceeds a second distance between the device location and the target location by at least an amount corresponding to the margin of error value, such that both the target location and the device location are within the boundary of the geofence; and
 generating, by the at least one processing device and based on the geofence, an alert indicating that the device location is within the geofence.

14. The method of claim 13, wherein the target is associated with at least one of the notification received from an external device or user preferences specifying one or more points of interest.

15. The method of claim 13, wherein determining the device location comprises using one or more network access points within communication range of the electronic device.

16. The method of claim 13, wherein generating the alert comprises generating the alert to a second electronic device.

17. The method of claim 13, wherein generating the alert includes determining at least one of a distance to the target, a route to the target, or an estimated time to the target.

18. The method of claim 13, further comprising deleting the geofence.

19. The method of claim 13, further comprising:
 determining that the device location is within the geofence; and
 generating the alert responsive to determining that the device location is within the geofence.

* * * * *